United States Patent Office 3,651,160
Patented Mar. 21, 1972

3,651,160
PRODUCTION OF STYRENE
Guenter Reuss, Ludwigshafen, and Heinz Engelbach and Juergen Haug, Limburgerhof, Germany, assignors to Badische Anilin- & Soda-Fabrik Aktiengesellschaft, Ludwigshafen (Rhine), Germany
No Drawing. Filed Sept. 11, 1969, Ser. No. 857,209
Claims priority, application Germany, Sept. 17, 1968, P 17 93 433.7
Int. Cl. C07c 15/10
U.S. Cl. 260—669   5 Claims

ABSTRACT OF THE DISCLOSURE

A process for the production of styrene by catalytic dehydrogenation of ethylbenzene with oxygen or a gas containing molecular oxygen in the presence of steam in a fluidized bed at a temperature of from 350° to 600° C. using a solid catalyst and regenerating the catalyst by burning off the carbonaceous deposits, which comprises carrying out the regeneration of the catalyst, with incomplete burning off of the carbonaceous deposits with oxygen or a gas containing molecular oxygen, only to such an extent that on an average the catalyst contains during the reaction from 1 to 30% by weight of these carbonaceous deposits with reference to the catalyst. Styrene is a valuable monomer for the production of plastics.

The present invention relates to a process for the production of styrene by catalytic dehydrogenation of ethylbenzene with oxygen in a fluidized bed.

British patent specification No. 737,881 describes a process in which dehydrogenation of ethylbenzene is carried out using conventional solid dehydrogenation catalysts in the presence of steam in a fluidized bed with an addition of oxygen. It is known from U.S. patent specification No. 3,336,408 that catalysts containing antimony oxides with or without oxides of metals of higher valence, such as vanadium, chromium, iron, cobalt, nickel or bismuth, may be used for the catalytic dehydrogenation of ethylbenzene in a fluidized bed.

The known methods for catalytic dehydrogenation of ethylbenzene in a fluidized bed have the disadvantage however that the activity of the catalysts declines after a relatively short time owing to the formation of carbon black deposits on the catalysts.

It is known, for example from W. L. Nelson, Petroleum Refinery Engineering, 4th edition (1958), pages 789 et seq., that the activity of catalysts on which deposits of carbon black have been formed can be restored by burning off the deposits as completely as possible, an excess of air being used as a rule for the regeneration.

It is an object of the present invention to provide a process for the production of styrene by catalytic dehydrogenation of ethylbenzene in which higher conversions and yields are obtained than in the prior art methods. Another object of the invention is to provide a process in which the catalysts have a longer life than in the prior art methods.

In accordance with this invention these and other objects and advantages are achieved in a process for the production of styrene by catalytic dehydrogenation of ethylbenzene with oxygen or gas containing molecular oxygen in the presence of stream in a fluidized bed at a temperature of from 350 to 600° C. using a solid catalyst and regenerating this catalyst by burning off the carbonaceous deposits, wherein the catalyst is regenerated, by burning off the carbonaceous deposits incompletely with oxygen or a gas containing molecular oxygen, only to such an extent that during the reaction it contains on an average from 1 to 30% by weight of these carbonaceous deposits with reference to the catalyst.

Conventional solid catalysts for the catalytic dehydrogenation of ethylbenzene with oxygen in a fluidized bed may be used for the process according to this invention. Such catalysts are described for example in U.S. patent specification No. 3,336,408 and in British patent specifications Nos. 904,602, 961,361, 978,520, 992,115 and 1,045, 789.

Catalysts which contain chromium oxides and alkali metal oxides such as lithium oxide, sodium oxide or potassium oxide are particularly suitable for the process according to the invention; the content of alkali metal oxides is generally from 1 to 50% by weight, preferably from 3 to 40% by weight, particularly from 4 to 20% by weight, of the content of chromium oxides. The catalysts may also contain an addition of 0.2 to 25% by weight of antimony-(III) oxide and/or 0.1 to 20% by weight of tin (IV) oxide and/or 1 to 30% by weight of phosphorus pentoxide.

These catalysts containing chromium oxides and alkali metal oxides may be used with particular advantage on inert carrier materials. Carrier materials having the highest possible abrasion resistance are used, such as natural or synthetic silicates, aluminosilicates, pumice, magnesium silicate, bleaching clays, titanium dioxide, zinc oxide, magnesium oxide, silicon, dioxide, aluminum oxide, particularly aluminas and silica gel. It is particularly advantageous to use aluminas whose mechanical strength has been increased by heating at 700° to 1200° C. for a short time. The proportion of chromium oxides and alkali metal oxides and any additives may be from 5 to 30% by weight with reference to the whole supported catalyst.

The catalysts are prepared by conventional methods. For example an aqueous solution which contains chromium in the form of trivalent or hexavalent compounds, such as chromium(VI) oxide or ammonium chromate, may have added to it an alkali metal oxide or an alkali metal compound which yields an alkali metal oxide when heated, such as a hydroxide, carbonate or acetate of an alkali metal, with or without a suitable antimony and/or tin compound and/or phosphoric acid. The solution is evaporated and the residue is dried first at 100° to 120° C. and then at 400° to 500° C. The product is preferably powdered and pelleted with an addition of a binder such as silica gel or graphite. When supported catalysts are used, the inert carrier for the catalyst may be impregnated in the usual way with an aqueous solution containing compounds of chromium and alkali metal with or without antimony compounds and/or tin compounds and/ or phosporic acid. It is advisable to heat the impregnated catalyst carrier for some hours at temperatures above 300° C., for example 400° to 600° C.

The finished catalyst generally has an internal surface area of from 10 to 300 square meters per gram and is advantageously used in a mean particle size of from 0.05 to 0.6 mm.

The process according to the invention may be used with advantage for the continuous production of styrene.

The amount of carbonaceous deposits formed during the dehydrogenation is kept at, on an average, from 1 to 30% by weight, preferably from 3 to 25% by weight by regenerating the catalyst. This carbon black content is advantageously maintained by removing a portion of the sooty catalyst from the fluidized bed at certain intervals or continuously, regenerating it in a regeneration zone and returning it to the fluidized bed. It is also possible however for the whole of the catalyst to be regenerated when the upper limit of the soot content is exceeded, the reactor itself advantageously being used as the regeneration zone. This method is advantageously used when the rate of sooting up is low.

Regeneration of the catalyst is carried out by burning off only incompletely (i.e. until the desired amount of soot has been achieved) the carbonaceous deposits on the catalyst to be regenerated in the presence of oxygen or gas containing oxygen, preferably air, at temperatures of from 300° to 600° C., preferably from 450° to 550° C. The oxygen or the gas containing oxygen supplied may be diluted with inert gas such as nitrogen, steam or flue gas, and may if desired be preheated, for example up to a temperature of 600° C. Means conventionally used for the purpose, for example a fluidized bed or an upflow tube, may be used for the regeneration. The continuous movement of the catalyst from the fluidized bed reactor to the regeneration zone and vice versa may be carried out in known manner, the catalyst material being either in fully fluidized condition or in the form of a compact, migrating stream. Control of the speed of conveyance of the catalyst is advantageously pneumatic, for example by supplying the desired amount of catalyst to a constant current of conveying gas by means of a regulatable amount of metering gas. The rate of conveyance may also be controlled by shutoff means such as slide valves or stopcocks for solids, or by conveying means such as screw conveyors or bucket wheels.

The product of the amount of catalyst circulating per unit time ($G_{cat}$) and the difference between the amount of soot deposits actually present in the fluidized bed reactor ($C_{rct}$) and in the regeneration zone ($C_{reg}$) is, under steady-state conditions, equal to the amount of soot formed per unit time in the fluidized bed reactor and which has to be burned off in the regeneration zone:

$G_{cat}(C_{rct}-C_{reg})$ =amount of soot formed per unit time

The percentage amounts $C_{rct}$ and $C_{reg}$ are only to be regarded as mean carbon black deposits on the catalyst because the individual fluidized particles will naturally have carbon black deposits of different magnitude according to their size and activity. The residence time of the catalyst in the regeneration zone and consequently its volume depends on the regeneration conditions used and on the nature of the carbon black.

It is necessary to know the carbon black load at all times and as accurately as possible in order to be able to regulate the solids circulation and to choose suitable regeneration conditions. It is advantageous to carry out the determination of the soot content of the bed of catalyst by measuring the dielectric constant of the flowing catalyst. This measurement may be carried out for example in a flow-type measuring cell in which reproducible values are obtained when the operating conditions such as moisture, bulk density of the catalyst, and temperature are kept constant.

Dehydrogenation of ethylbenzene is advantageously carried out using pure oxygen, but may also be carried out with a gas containing more than 1 mole percent of molecular oxygen. It is preferable to use mixtures of oxygen and nitrogen, particularly air. Generally 0.1 to 1 mole, preferably 0.2 to 0.5 mole, of oxygen is used per mole of ethylenzene.

The amount of steam added for the dehydrogenation may vary within wide limits and is generally from 0.1 to 3 kg. preferably from 0.1 to 1 kg., and particularly from 0.3 to 0.8 kg., per kg. of ethylbenzene.

Dehydrogenation is carried out in a temperature range of from 350° to 600° C., preferably from 380° to 55°0 C., particularly from 430° to 500° C. Atmospheric or super-atmospheric pressure, for example up to 30 atmospheres gauge, it usually used.

Dehydrogenation is carried out in a fluidized bed of catalyst. Ethylbenzene, oxygen and steam are introduced into the bed of catalyst in such a way that the particles of catalyst are fluidized. All the reactants may be introduced separately into the fluidized bed or two of the reactants may be mixed and the third introduced separately. It is advantageous however to mix all three reactants prior to entry into the fluidized bed. Some of the steam may also be introduced separately and if desired as liquid water into the reactor. The concentration of steam in the mixture should however be sufficient to prevent preignition.

The individual components of the gas mixture or the gas mixture as a while are advantageously preheated, for example to temperatures of up to 500° C., prior to entry into the reaction zone.

The vapors leaving the reaction zone are condensed and the aqueous phase is separated. Styrene is recovered from the organic phase in a conventional manner by distillation.

Styrene is a valuable monomer for the production of plastics.

The invention is illustrated by the following examples.

EXAMPLE 1

A globular supported catalyst (catalyst B) is prepared by repeated impregnation of silica gel with a suitable salt solution. The finished catalyst has the following composition (in percent by weight): 0.1% of $Li_2O$. 1.2% of $K_2O$, 0.5% of $SnO_2$, 2.5% of $Sb_2O_3$ and 12.8% of $Cr_2O_3$ and its particle size ranges from 0.05 to 0.5 mm., its bulk density is 510 g./l. and its internal surface area 290 m.$^2$/g. 580 ml. of catalyst is introduced into a fluidized bed reactor of quartz glass having a diameter of 60 mm. and provided with a frit and a filter candle and the same amount of catalyst introduced into a fluidized bed regenerator of the same size. The following amounts of substance are used for the dehydrogenation: 0.2 kg. of ethylbenzene per liter of catalyst per hour, 0.5 kg. of steam per kg. of ethylbenzene and 0.43 mole of oxygen per mole of ethylbenzene. The substances which have been heated up and vaporized are well mixed and reacted in the fluidized bed of the reactor at 490° C. The catalyst in the regeneration zone is first fluidized by introducing 70 liters (STP) per hour of nitrogen and kept at 400° C. by heating. After operation for six hours 100 ml. of catalyst is transferred from each of the two fluidized beds simultaneously into measuring vessels and the exchange of catalyst is effected by pneumatic conveyance. As a result of the continuous formation of carbon black during dehydrogenation and the circulation of the catalyst between the two fluidized beds, a practically uniform increase in the carbon black load takes place. As soon as the carbon black load in the fluidized bed reactor has reached 7% by weight, regeneration is commenced. 1 liters (STP) per hour of air is supplied through a mixing nozzle to the nitrogen for the regeneration zone and, when a 14% by weight carbon black load has been reached, 3 liters (STP) per hour of air at room temperature is introduced and the carbon black burned off at 450° C. The process operated in this way for the continuous production of styrene is continued for a total of 4½ months without any disturbance in operation. It will be seen from Table 1 that at the carbon black loads chosen, optimal conversions and yields can be maintained over long periods. Referring to Table 1 below, the mean error in the carbon black loads is ±1.8% by weight, in the conversion ±1.5%, and in the yield of styrene ±1.0% (with reference to ethylbenzene reacted).

In Table 1:

Time = duration of the experiment in hours
Carbon black load is given in percent by weight
Conv. = conversion of ethylbenzene in percent
Styr. = yield of styrene in percent

TABLE 1

| Time | Carbon black load | | Conv. | Styr. |
|---|---|---|---|---|
| | $C_{rct}$ | $C_{reg}$ | | |
| 144 | 7.2 | 3.9 | 42.8 | 92.7 |
| 360 | 13.9 | 10.2 | 41.9 | 90.9 |
| 600 | 13.5 | 10.3 | 42.0 | 91.0 |
| 1,068 | 11.8 | 10.1 | 41.5 | 90.8 |
| 1,404 | 14.1 | 9.5 | 41.6 | 91.2 |
| 2,076 | 14.4 | 10.0 | 41.7 | 90.9 |
| 3,180 | 14.9 | 11.5 | 41.3 | 91.1 |

EXAMPLE 2

A catalyst having the following composition (in percent weight): 0.02% of $Li_2O$, 1.2% of $K_2O$, 5% of $SnO_2$, 1.0% of $Sb_2O_3$ and 12.8% of $Cr_2O_3$ on silica gel (catalyst C), is used in the apparatus described in Example 1 for the dehydrogenation using the same amount of catalyst as in Example 1. The amounts used for dehydrogenation are: 0.2 kg. of ethylbenzene per liter of catalyst per hour, 0.35 kg. of water per kg. of ethylbenzene, and (with air as the dehydrogenation agent) 0.43 mole of oxygen per mole of ethylbenzene. The reaction temperature is 500° C. 100 mol of catalyst is exchanged between the two fluidized beds every three hours. Regeneration is effected with 3 to 5 liters (STP) per hour of air in 70 liters (STP) of nitrogen at 450° to 490° C. In order to achieve higher or lower carbon black loads between the various phases of the experiment, the regeneration air is entirely shut off for some time or increased beyond the value given. The three sets of regeneration conditions used are equivalent because steady-state conditions can be achieved with each of them; it shows that conversions and yields of approximately equal value are obtained within a wide range of carbon black loads.

In Table 2:

Air = the amount of regeneration air in 1 (STP)/h.
Temp. = the temperature in °C. in the regeneration.

TABLE 2

| Time | Air | Temp. | Carbon black load | | Conv. | Styr. |
|---|---|---|---|---|---|---|
| | | | $C_{rct}$ | $C_{reg}$ | | |
| 144 | 5 | 450 | 8.5 | 7.0 | 42.3 | 89.7 |
| 384 | 5 | 450 | 16.7 | 14.3 | 41.5 | 90.9 |
| 576 | 5 | 450 | 24.1 | 21.4 | 38.7 | 89.2 |
| 792 | 3.5 | 480 | 18.2 | 15.7 | 40.5 | 91.0 |
| 1,032 | 3.5 | 480 | 9.5 | 7.1 | 42.7 | 90.3 |
| 1,152 | 3.5 | 480 | 3.2 | 1.7 | 40.0 | 91.7 |
| 1,296 | 3 | 490 | 6.0 | 3.8 | 41.2 | 89.8 |
| 1,488 | 3 | 490 | 14.1 | 11.0 | 41.7 | 88.7 |
| 1,728 | 3 | 490 | 21.5 | 19.3 | 39.8 | 90.2 |

Comparative experiment A 580 ml. of catalyst D (prepared analogously to Example 1 and having the following composition in percent by weight: 0.02% of $LiO_2$, 1.2% of $K_2O$, 2.5% of $SnO_2$, 5.0% of $Sb_2O_3$ and 12.8% of $Cr_2O_3$ on silica gel) is used in the fluidized bed reactor. The following amounts are used for the dehydrogenation: 0.2 kg. of ethylbenzene per liter of catalyst per hour, 0.5 kg. of water per kg. of ethylbenzene and 0.43 mole of oxygen (in the form of air) per mole of ethylbenzene. The reaction temperature is 480° C. The catalyst is not regenerated. As the carbon black load of the catalyst increases, the conversion and yield reach a maximum and then decline continuously.

TABLE 3

| Time | Carbon black load, $C_{rct}$ | Conv. | Styr. |
|---|---|---|---|
| 12 | 0.5 | 31.1 | 87.0 |
| 36 | 4.8 | 39.4 | 90.2 |
| 84 | 12.4 | 43.8 | 91.5 |
| 150 | 21.4 | 41.3 | 90.6 |
| 300 | 25.3 | 34.3 | 87.5 |
| 420 | 31.2 | 29.3 | 85.5 |

EXAMPLE 3

The catalyst from Example 1 is used in the same apparatus and in the same amount as in Example 1. The amounts used for the dehydrogenation are: 0.2 kg. of ethylbenzene per liter of catalyst per hour, 0.5 kg. of water per kg. of ethylbenzene and increasing amounts of oxygen ranging from 0.43 to 0.658 mole per oxygen per mole of ethylbenzene in order to produce higher conversions, and, consequently, larger amounts of carbon black. The reaction temperature is 500° C. 100 ml. of catalyst is exchanged between the two fluidized beds every six hours. Regeneration is carried out with a gas mixture of 3 liters (STP) per hour of oxygen and 58 g./h. of steam at temperatures of from 350° to 450° C. Steady-state conditions are achieved with each set of conditions.

In Table 4:

Mole = moles of oxygen per mole of ethylbenzene in the dehydrogenation.

TABLE 4

| Time | Mole | Temp. | Carbon black load | | Conv. | Styr. |
|---|---|---|---|---|---|---|
| | | | $C_{rct}$ | $C_{reg}$ | | |
| 310 | 0.430 | 350 | 11.9 | 9.7 | 41.8 | 90.5 |
| 598 | 0.462 | 400 | 15.5 | 13.2 | 42.5 | 89.8 |
| 652 | 0.506 | 430 | 10.4 | 8.0 | 44.8 | 88.7 |
| 760 | 0.658 | 450 | 9.6 | 7.0 | 49.5 | 82.0 |

Comparative experiment B

Catalyst A is prepared analogously to Example 1 with the following composition in percent by weight: 0.02% of $Li_2O$, 1.2% of $K_2O$, 2.0% of $P_2O_5$ and 12.8% of $Cr_2O_3$ on silica gel. This catalyst A and catalyst B (from Example 1), catalyst C (from Example 2) and catalyst D (from comparative experiment A) are used successively in experiments in which 5.0 ml. of catalyst is used in the fluidized bed reactor described in Example 1 and carbon black loads of more than 30% by weight are produced on the various catalysts by continuous dehydrogenation without regeneration. Then the various catalysts are regenerated, with 100 liters (STP) per hour of air in the fluidized bed at 520° C. in the course of twelve hours by burning off the carbon black deposits to less than 1% by weight. The catalysts prepared in this way are then used in experiments during twenty-four hours to test their activity and selectivity for dehydrogenation. The amounts used for the dehydrogenation are: 0.2 kg. of ethylbenzene per liter of catalyst per hour, 0.5 kg. of water per kg. of ethylbenzene and 0.43 mole of oxygen per mole of ethylbenzene (as air). The reaction temperature is 470° C. The example shows that burning off all the carbon black results in decreased yields and conversions.

In Table 5:

Before and After: carbon black load $C_{rct}$ in percent by weight before and after;
Cat. = type of catalyst.

TABLE 5

| Cat. | Before | After | Conv. | Styr. |
|---|---|---|---|---|
| A | 38.7 | 0.7 | 32.4 | 82.4 |
| B | 32.4 | 0.1 | 28.7 | 78.5 |
| C | 34.8 | 0.4 | 30.9 | 81.1 |
| D | 31.4 | 0.1 | 24.0 | 80.8 |

EXAMPLE 4

A catalyst having the following composition (in percent by weight): 0.02% of $Li_2O$, 1.2% of $K_2O$ and 12.8% of $Cr_2O_3$ (the remainder being silica gel) is prepared by impregnating silica gel with an appropriate salt solution. In 600 ml. of this catalyst is introduced into the fluidized bed reactor and the same amount into the regeneration zone of the apparatus described in Example 1. Dehydrogenation is carried out with a catalyst loading of 0.2 kg. of ethylbenzene per liter of catalyst per hour, 0.5 kg. of water per kg. of ethylbenzene and 0.43 mole of oxygen per mole of ethylbenzene (as air). After one hundred hours, regeneration is begun at a temperature of 490° C. by using 5 to 10 liters (STP) per hour of regeneration air and 70 liters (STP) per hour of nitrogen for fluidization. Circulation of the catalyst between the fluidized bed reactor and the regeneration zone is carried out continuously by pneumatic conveyance of 400 ml. of catalyst per hour. The desired carbon black load in each case is set up by varying the amount of regeneration air. The carbon black load of the two fluidized beds is about the same. Fresh catalyst is supplied to compensate for attrition.

In Table 6:

RT=reactor temperature in ° C.

TABLE 6

| Time | RT | Air | Carbon black load | | Conv. | Styr. |
| --- | --- | --- | --- | --- | --- | --- |
| | | | $C_{rot}$ | $C_{reg}$ | | |
| 100 | 490 | | 11.6 | | 46.4 | 90.5 |
| 528 | 490 | 10 | 25.9 | | 46.3 | 89.8 |
| 1,224 | 480 | 7.5 | 16.0 | | 43.0 | 88.7 |
| 1,824 | 480 | 5 | 19.2 | | 41.5 | 89.4 |
| 2,448 | 480 | 5 | 18.6 | | 42.6 | 90.1 |
| 2,952 | 480 | 7 | 21.1 | | 42.0 | 89.6 |
| 3,742 | 480 | 9 | 21.2 | | 42.1 | 89.8 |

EXAMPLE 5

In the measurement of the dielectric constant (DC) of solutions a linear relationship with the concentration is discovered; similarly, fluid materials, for example catalysts in a fluidized bed, cause a change in DC when varying amounts of carbon black have been deposited on them as a result of a reaction. The measured value of the relative DC ($E_r$) depends on the nature of the medium in the measuring cell, such as the composition of the catalyst, its particle spectrum, the amount and nature of the carbon black deposit, moisture, and the bulk density of the catalyst charge.

To measure the relative DC, the carbon black-free catalyst according to Example 4 (1), a sample of the same catalyst with a carbon black load of 30.9% by weight (2), and another sample having a carbon black load of 39.3% by weight are placed successively in a flow-type measuring cell and the relative DC determined in each case. By mixing varying proportions of (1) and (2), four other products ((1a), (1b), (1c) and (1d)) and by mixing equal amounts of (2) and (3) a further sample (2a) are prepared and likewise subjected to measurement of DC. Within the limits of measurement accuracy, there is a clear, constant, nonlinear relationship between the relative DC and the carbon black load in percent by weight, which can be used as a calibration curve for process control because a change in the carbon black load of as little as 2% by weight is reliably indicated by the measurement.

The measurements are given in Table 7 in which are indicated the carbon black load in percent by weight and the relative dielectric constant DC ($E_r$).

TABLE 7

| Catalyst sample | Carbon black load percent by weight | Relative dielectric constant DC ($E_r$) |
| --- | --- | --- |
| 1 | 0.0 | 1.54 |
| 1a | 3.0 | 1.75 |
| 1b | 13.0 | 2.50 |
| 1c | 21.4 | 3.40 |
| 1d | 28.2 | 4.40 |
| 2 | 30.9 | 4.94 |
| 2a | 35.1 | 6.00 |
| 3 | 39.3 | 7.60 |

We claim:

1. An improved process for the production of styrene by catalytic dehydrogenation of ethylbenzene with oxygen or a gas containing molecular oxygen in the presence of steam in a fluidized bed at a temperature of from 350° to 600° C. using a solid catalyst and regenerating this catalyst, wherein the improvement comprises regenerating the catalyst, by burning off the carbonaceous deposits on the catalyst incompletely with oxygen or a gas containing molecular oxygen, only to such an extent that it contains an average from 1 to 30% by weight of these carbonaceous deposits with reference to the catalyst during the dehydrogenation reaction.

2. A process as set forth in claim 1 wherein regeneration is carried out by constantly withdrawing some of the catalyst containing carbonaceous deposits at definite intervals or continuously from the fludized bed, regenerating it in a regeneration zone and returning it to the fluidized bed.

3. A process as set forth in claim 1 wherein when the upper limit of carbon black load has been exceeded, the whole of the catalyst is regenerated.

4. A process as set forth in claim 3 wherein the reactor itself is used as the regeneration zone.

5. A process as in claim 1 wherein the amount of carbonaceous deposits on said catalyst during the dehydrogenation reaction is from 3 to 25% by weight.

References Cited

FOREIGN PATENTS 737,881   10/1955   Great Britain _____ 260—669

CURTIS R. DAVIS, Primary Examiner

U.S. Cl. X.R.

252—418

PO-1050
(5/69)

UNITED STATES PATENT OFFICE
CERTIFICATE OF CORRECTION

Patent No. 3,651,160                     Dated March 21, 1972

Inventor(s) Guenter Reuss, Heinz Engelbach, and Juergen Haug

It is certified that error appears in the above-identified patent and that said Letters Patent are hereby corrected as shown below:

Column 2, line 33, "silicon, dioxide" should read -- silicon dioxide --.

Column 3, line 45, "time" should read -- time. --.

Column 4, line 2, "55°0" should read -- 550° --; line 60, "1 liters (STP)" should read -- 1 liter (STP) --.

Column 8, line 8, "(Er)" should read -- ($E_r$) --; line 32, claim 2, "fludized" should read -- fluidized --.

Signed and sealed this 19th day of September 1972.

(SEAL)
Attest:

EDWARD M. FLETCHER, JR.
Attesting Officer

ROBERT GOTTSCHALK
Commissioner of Patents